United States Patent [19]

Robinson et al.

[11] 3,904,985
[45] Sept. 9, 1975

[54] EXPLOSIVE LASER

[75] Inventors: C. Paul Robinson; Reed J. Jensen; William C. Davis; John A. Sullivan, all of Los Alamos, N. Mex.

[73] Assignee: The United States of America as represented by the United States Energy Research and Development Administration, Washington, D.C.

[22] Filed: Feb. 5, 1974

[21] Appl. No.: 439,793

Related U.S. Application Data

[63] Continuation of Ser. No. 210,624, Dec. 21, 1971, abandoned.

[52] U.S. Cl. .............................. 331/94.5 G; 330/4.3
[51] Int. Cl.² ..................... H01S 3/22; H01S 3/095
[58] Field of Search ................. 331/94.5 G, 94.5 P; 330/4.3

[56] References Cited
UNITED STATES PATENTS 3,623,145  11/1971  Gregg et al. ................. 331/94.5 G

OTHER PUBLICATIONS

Dzhidzhoev et al., Jetp Letters, Vol. 14, pp. 47+ (1971).
Marchenko et al., Jetp Letters, Vol. 14, pp. 76+ (1971).

Primary Examiner—Robert J. Webster
Attorney, Agent, or Firm—Dean E. Carlson; Edward C. Walterscheid

[57] ABSTRACT

A laser system wherein reaction products from the detonation of a condensed explosive expand to form a gaseous medium with low translational temperature but high vibration population. Thermal pumping of the upper laser level and de-excitation of the lower laser level occur during the expansion, resulting in a population inversion. The expansion may be free or through a nozzle as in a gas-dynamic configuration. In one preferred embodiment, the explosive is such that its reaction products are $CO_2$ and other species that are beneficial or at least benign to $CO_2$ lasing.

14 Claims, 3 Drawing Figures

EXPLOSIVE LASER

The invention described herein was made in the course of, or under, a contract with the U.S. ATOMIC ENERGY COMMISSION. It relates to the field of gas lasers and more particularly to thermally pumped gas lasers wherein population inversion is produced by differential vibrational relaxation caused by collisions of molecules during supersonic expansion of the lasing medium.

This is a continuation of application Ser. No. 210,624, filed Dec. 21, 1971, now abandoned.

BACKGROUND OF THE INVENTION

It is well known in the art that substantial population inversions can be obtained in mixtures of heated nitrogen and carbon dioxide or nitrogen and carbon monoxide by expansion of the mixtures through a supersonic nozzle. Under the general name of gas dynamic lasers, a wide variety of laser systems embodying this principle have been devised. A mixture of hot molecular gases is expanded through a supersonic nozzle. The composition of the gas mixture is chosen such that when it expands the collision-relaxation times, $\tau_1$ and $\tau_2$ of the lower (1) and upper (2) vibrational laser levels satisfy the condition $\tau_1 << \tau_2$. In addition, the rate of the expansion should be sufficiently high so that the depletion of level 2 as a result of relaxation is slower than as a result of adiabatic cooling of the gas mixture.

The art indicates that in $CO_2$ gas dynamic lasers it is desirable to have a small quantity of water present in the hot molecular gas mixture. The water acts as a catalyst to cause the lower vibrational level in the $CO_2$ to relax in a time less than that required for expansion of the mixture through the nozzle. However, the presence of too much water vapor inhibits the laser process because the cross section for $H_2O$ relaxation of the $CO_2$ antisymmetric mode is substantial. The amount of water vapor that can be tolerated, however, appears to be dependent to a considerable degree on the rate of expansion of the mixture through the nozzle.

Until very recently, the literature states that for continuous wave laser systems the heated mixture could be obtained by heating an appropriate mixture of molecular gases (e.g., $CO_2$, $N_2$, and $H_2O$) by means of an electric arc or in a heat exchanger or nuclear reactor or by combustion of a suitable fuel mixture to produce the desired heated gas mixture. For a pulsed laser system, the high-temperature mixture could readily be obtained by passage of a shock wave through the gaseous medium.

Perhaps the best known gas dynamic laser system is the continuous wave combustion system described by E. T. Gerry in Laser Focus, p. 27 (December 1970). This system is substantially limited by the relatively low temperatures—on the order of 1400°K—to which the gas mixture is heated by the combustion process. At higher temperatures the energy fraction appearing in vibrations is much improved. In addition, the very high mass flow required by such combustion lasers is a limiting factor. In an effort to overcome these problems, J. Tulip and H. Seguin disclose an explosion-pumped gas-dynamic $CO_2$ laser in which the required high-pressure, high-temperature reservoir condition is achieved using an explosion of a mixture of gaseous oxygen and gaseous fuels such as $CO + H_2$, natural gas, propane, and acetylene. The system achieves pulsed lasing action under extremes of oxygen excess and starvation. A maximum reservoir temperature of 1700°K is reported.

In Zh. Eksp. Teor. Fiz. Pis. Red. 14, 116 (July 20, 1971), V. M. Marchenko and A. M. Prokhorov discuss the possibility of producing an inverted medium for lasers by means of an explosion. (An English translation of this paper is available as JETP Letters 14, 76 (1971).) They indicate that it has been shown that in the free expansion of the explosion products of certain explosive substances, the conditions necessary to realize a population inversion in the vibrational states of certain molecules can be realized without using gas dynamic devices such as nozzles. Because of the absence of references cited to support the foregoing statement, it is thought that the statement refers to a proof provided in the same article.

According to Marchenko and Prokhorov, "The problem consists of choosing an explosive substance whose explosive products have a gas composition which makes it possible to realize the required relaxation scheme, analogous, for example, to that used in known gas dynamic lasers. This requirement can be satisfied by a number of gaseous and condensed explosive substances. The rate of expansion of the explosive products, heated in accordance with the type of the explosive substance to $(2-5) \times 10^{3}°K$, reaches $10^5-10^6$ cm/sec, i.e., it is comparable with and even higher than the gas-stream velocity in gas dynamic lasers." Although Marchenko and Prokhorov suggest condensed explosives as both the energy source and the source of the lasing mixture, they show by example only the explosive reaction of a gaseous mixture of acetylene and air. The maximum temperature achieve in such a reaction apparently does not exceed 2400°K.

In Zh. Eksp. Teor. Fiz. Pis. Red. 14, 73 (July 20, 1971) (English translation in JETP Letters 14, 47 (1971)), Dzhidzhoev et al., disclose a detonation gas dynamic laser in which the initial high-temperature gas mixture is obtained by detonating a solid. The explosive reaction mixture consisted of $HN_3$, $CO_2$ and xenon frozen on a metallic rod. The pressure and temperature in the reservoir after the expansion of the detonation products were apparently of the order of 10–20 atm and 2000°–3000°K, depending on the amount and composition of the mixture, with a maximum laser energy obtained at a relative content of the components corresponding to an approximate initial detonation-product temperature of 2500°K. The use of these condensed gaseous reactants to provide a solid explosive mixture has several disadvantages. A liquid nitrogen reservoir is required to condense the reactants. Additionally, freezing the reactants places limitations on the configuration of the explosive solid. Finally, $HN_3$ is an exceedingly sensitive explosive and requires extreme safety precautions in its use.

SUMMARY OF THE INVENTION

We have found that the reaction products from the detonation of a variety of condensed explosives expand to form a gaseous medium with low translational temperatures but high population of vibrational states. Thermal pumping of the upper laser level and deexcitation of the lower laser level occur during the expansion, resulting in a population inversion exhibiting high gain. The expansion may be free or through a nozzle as in a gas dynamic system. The use of a nozzle with an appropriate expansion ratio avoids the possibility of refraction problems caused by varying densities of the detonation products in a free expansion.

The condensed explosives are tailored such that their detonation products are essentially CO or $CO_2$ and other species that are beneficial or at least benign to CO or $CO_2$ lasing. They may take the form of organic compounds containing an appropriate ratio of carbon, oxygen, and nitrogen to produce gas mixtures leading to CO or $CO_2$ lasing at the temperatures produced by the detonation. The condensed explosives are not limited to those substances that are solids at room temperature but may readily consist of such mixtures as $HN_3$ and $CO_2$ or $ClN_3$, $CO_2$, and $H_2O$, or CO, $O_2$, and $HN_3$ that can readily be frozen to produce a condensed explosive mixture with detonation products leading to $CO_2$ lasing. Oxygen-deficient organic explosives that produce free carbon as one of their detonation products are—when used alone to produce the lasing medium—undesirable in that the free carbon is opaque to the 10.6 micron radiation produced by $CO_2$ lasing. This problem can readily be avoided by adding an oxidizer to the organic explosive or by causing it to detonate into an atmosphere containing sufficient oxygen to oxidize the free carbon during the early stages of the expansion of the detonation products.

Laser systems employing condensed explosives are inherently pulses systems with a capability of providing very high energy pulses. Common organic explosives can produce detonation products at temperatures in excess of 4000°K. In this temperature regime, the efficiency of transfer of vibrational energy from nitrogen to carbon dioxide, for example, is much greater than it is at 1400°K or even at 2500°K—the highest operating temperature reported in the literature for a gas dynamic system.

By detonating the condensed explosive hexanitroso- benzene into a pressurized oxygen-rich atmosphere in a gas-dynamic configuration, we have achieved an observed gain of 3.12 %/cm. The highest gain heretofore reported for a gas dynamic laser has been less than 1 %/cm.

GENERAL DESCRIPTION

Figure 1:
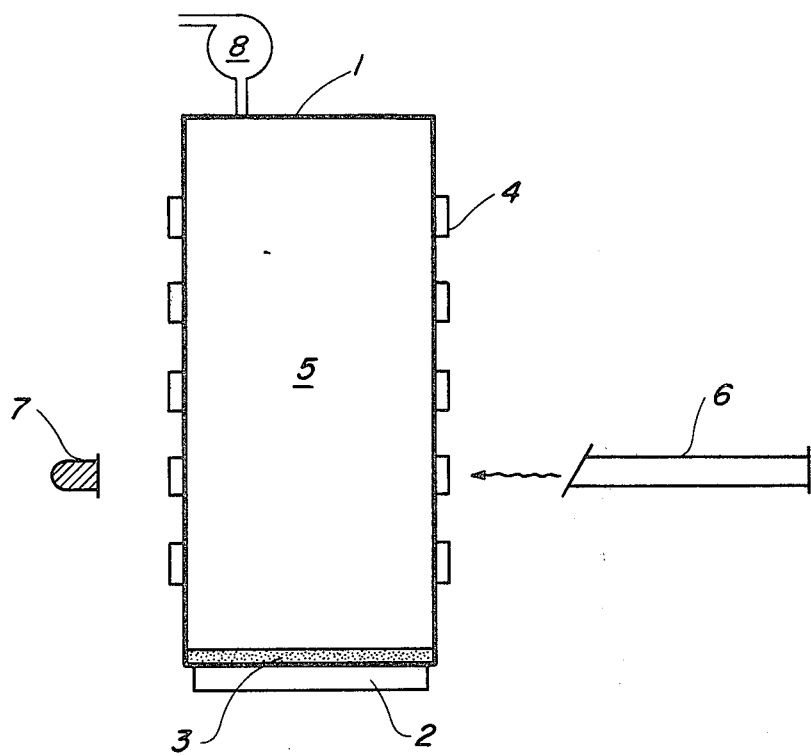
FIG. 1 is a simplified schematic of an explosive laser system employing free expansion of the detonation products.

The concept of a gas dynamic laser is to produce by some thermal method vibrationally excited nitrogen molecules and, by rapid expansion through a nozzle, to vibrationally freeze the excited population while the translational-rotational temperatures are reduced. Collisions between the vibrationally excited $N_2$ molecules and $CO_2$ molecules results in a selective excitation by vibrationalvibrational (V—V) transfer to the 00°1 level in $CO_2$ and the subsequent population inversion for the 10.6μm laser transition (00°1 to 10°0).

It is known in the art that laser power output and efficiency increase rapidly with $N_2$ stagnation temperature and that the V—V transfer mechanism results in population of the $CO_2$ 00°1 state by $N_2$ states of V = 1 through 6. Fein et al., Appl. Phys. Lett. 14, 337 (1969), have defined a quality factor for this mechanism as $$f = \frac{\text{number of } CO_2 \text{ pumping quanta available}}{\text{number of } N_2 \text{ molecules present}}$$

which can also be interpreted as the number of $CO_2$ molecules which can be pumped by an (average) $N_2$ molecule. Thus, for a given system, the value of $f$ will determine the optimum mixture ratio between $CO_2$ and $N_2$, and systems with higher $f$ values will have higher efficiencies.

To evaluate $f$, thermal equilibrium at the stagnation temperature is assumed and statistical mechanics formulae applied to determine the relative populations of the $N_2$ excited states. The vibration energy spacing in $N_2$ is 2331 cm$^{-1}$, corresponding to an energy of 4.63 × 10$^{-20}$ joule. The relative population between any two states separated by energy $\Delta E$ is $$R = \frac{N_a}{N_b} = \exp(-\Delta E_{ab}/kT)$$

where $k$ is Boltzmann's constant. Fractional populations of the $N_2$ vibrational states thus calculated for given temperatures are shown in Table I.

TABLE I

| T (°K) | $n_0$ | $n_1$ | $n_2$ | $n_3$ | $n_4$ | $n_5$ | $n_6$ |
|---|---|---|---|---|---|---|---|
| 400 | 0.9998 | 0.00023 | — | — | — | — | — |
| 1400 | 0.909 | 0.083 | 0.0075 | 0.00069 | — | — | — |
| 4600 | 0.521 | 0.251 | 0.121 | 0.0584 | 0.0282 | 0.0136 | 0.0065 |

The quality factor $f$ for a thermal $N_2/CO_2$ laser can therefore be derived in closed form from the formula $$f = e^{-\Delta E_1/kT} + 2e^{-2\Delta E_1/kT} + \ldots + ne^{-n\Delta E_1/kT}$$

where equal energy spacing has been assumed. This series can be summed by defining $$x = e^{-\Delta E_1/kT}$$

and noting that $$\frac{1}{(1-x)^2} = 1 + 2x + 3x^2 + \ldots \frac{(K+1)!}{k!}x^k.$$

Thus $$f = \frac{e^{-E_1/kT}}{(1 - e^{-E_1/kT})^2}.$$

The quality factor $f$ is evaluated in Table II for several temperatures of interest. It can readily be seen that the value at T = 4600°K is much larger than that at T = 1400°K.

TABLE II

| T (°K) | f |
|---|---|
| 400 | 0.00023 |
| 1400 | 0.11 |
| 3000 | 0.72 |
| 4600 | 1.8 |

The foregoing analysis is also applicable to $N_2/CO$ thermal lasers. The literature discloses that nitrogen, with its vibrational energy levels nearly resonant to those of CO, plays a similar role to that in $N_2/CO_2$ lasers by serving as an energy reservoir from which $N_2$ vibrational energy is rapidly transferred directly to the vibrational states of CO.

Thus in thermal $N_2/CO_2$ and $N_2/CO$ laser systems it is highly desirable to achieve very high stagnation temperatures. These high temperatures, i.e., in excess of 4000°K, can readily be produced through the detonation of condensed explosives. In addition, condensed explosives can be tailored to produce the lasing medium as detonation products. That is to say, the reaction products of the detonation can be designed to be $CO_2$, CO, $N_2$, and other species that are beneficial or at least benign to CO or $CO_2$ lasing. Organic explosives are particularly attractive for this purpose because of their content of carbon, oxygen, and nitrogen. Organic explosives may be used singly or in mixtures and they may be solid or liquid. The criterion for their use is that they produce sufficient quantities of CO and $N_2$ or $CO_2$ and $N_2$ to provide the lasing medium desired without also producing species harmful to lasing in the medium.

The organic explosive may be a single cmpound or mixture of compounds. An example of an organic explosive used alone is pentanitroaniline which exhibits the following theoretical stoichiometry on detonation.

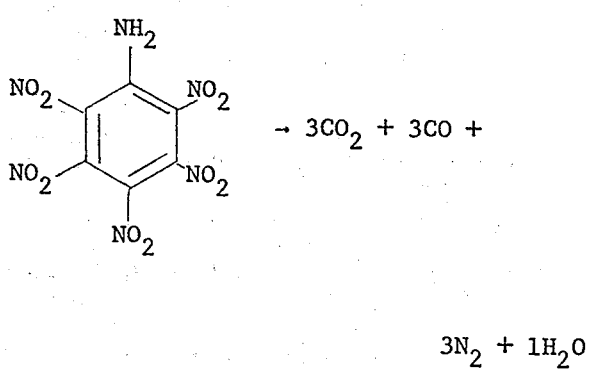

The nitrogen may couple vibrationally with both the $CO_2$ and the CO so that it is possible to achieve both CO and $CO_2$ lasing in these reaction products. With regard to $CO_2$ lasing, the CO is benign and the $H_2O$ is beneficial in that it helps to relax the lower vibrational level in the $CO_2$.

Examples of mixtures of compounds that may be used to provide suitable detonation products for lasing are tetranitromethane ($CN_4O_8$) plus acrylonitrile ($C_3H_3N$) or tetranitromethane plus hexanitrosobenzene (also called benzotrifuroxane) ($C_6N_6O_6$). The latter mixture theoretically provides the following products.

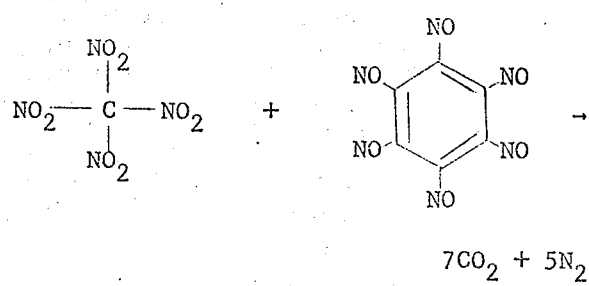

Hexanitrosobenzene alone is explosive and may be detonated; however, the calculated reaction products per mole are 2.5 moles $CO_2$, 1 mole CO, 3 moles $N_2$, and 2.5 moles free carbon plus trace amounts of $O_2$ and NO. The presence of free carbon is highly detrimental to $CO_2$ lasing because the carbon is opaque to radiation at 10.6μm. The free carbon is produced because the hexanitrosobenzene is oxygen-deficient. This deficiency is readily remedied by mixing it with an oxygen-rich compound such as tetranitromethane as indicated, by adding an inorganic oxidizer such as perchloric acid, or by detonating it into an oxygen-rich atmosphere such that the free carbon is rapidly oxidized to CO or $CO_2$. This latter approach is readily accomplished in a gas dynamic system by detonating the hexanitrosobenzene in a stagnation reservoir pressurized with oxygen.

It will be readily apparent that a great variety of explosive organic compounds or mixtures may quite simply be designed such that the detonation products have stoichiometries suitable for either CO or $CO_2$ lasing. Although it is desirable from the viewpoint of design and operational simplicity, the scope of this invention is not limited to the use of those condensed explosives that are solid or liquid at room temperature. Gaseous or liquid explosive mixtures which when frozen produce detonation products having the required stoichiometry for lasing are within the scope of the invention. While the necessity for freezing such mixtures has the disadvantage of the presence of cryogenic materials such as liquid nitrogen, it enables the mixture to be easily tailored to the desired composition by the addition of particular gaseous or liquid components.

In the detonation of condensed explosives, the reaction products expand initially at rates of $10^5$–$10^6$ cm/sec. These free expansion rates are higher than those normally achieved in gas dynamic lasers so that if the expanding mixture of the detonation products is of a suitable composition, vibrational freezing should in principle be possible such that a substantial population inversion in, e.g., $CO_2$ results. We have found this to be the case in the free expansion of the detonation products of a condensed explosive even when the mixture of detonation products contains an excess of $H_2O$ and therefore is not optimum for $CO_2$ lasing.

A problem with free expansion explosive laser systems is that density gradients can exist within the expanding gas mixture. These density differences may produce refraction of the light beam such that additional optics are required to obtain an appropriately focused beam from the lasing mixture. This problem can readily be avoided by allowing the detonation to occur within the stagnation reservoir of a gas dynamic system. The detonation products then pass through a supersonic nozzle in the same fashion that the combustion products do in a typical gas dynamic laser. After passing through the nozzle the detonation products have a uniform density, and refraction is no longer a problem. An explosive laser in a gas dynamic configuration also has the added advantage that the stagnation reservoir can readily be pressurized with oxygen or gas mixtures that aid in the formation of a suitable lasing medium in the expansion chamber of the system.

DESCRIPTION OF THE PREFERRED EMBODIMENTS

A schematic for an experimental setup for an explosive laser employing free expansion of the detonation products is shown in FIG. 1. A condensed explosive 3 is placed at one end of a vacuum chamber 1, and volume 5 within chamber 1 is evacuated. Optical windows 4 are located in chamber 1 to allow passage of a beam from a probe laser 6 to be passed through chamber 1 in a direction perpendicular to that of the flow of the expanding detonation products at a number of distances from the original surface of the condensed explosive. A detector 7 is used to measure variances in the intensity of the probe laser beam after it passes through the expanding detonation products. The system is operated by turning on the probe laser and then detonating explosive 3 by means of detonator 2. If $CO_2$ lasing is being determined, probe laser 6 is a $CO_2$ oscillator laser and detector 7 is a fast infrared detector. It will be apparent that the configuration shown in FIG. 1 is basically an amplifying explosive laser. By replacing optical windows 4 with appropriate mirrors, vacuum chamber 1 can readily be transformed into an optical cavity such that the system operates as an oscillator.

To demonstrate that a substantial population inversion can be achieved in the free expansion of the detonation products of a condensed organic explosive, EC30 detonating caps were detonated in an experimental arrangement similar to that shown in FIG. 1. These detonating caps consist of 30 mg of pentaerythritol tetranitrate (PETN) containing an electrical bridge wire. The detonation products of one mole of PETN are measured to be

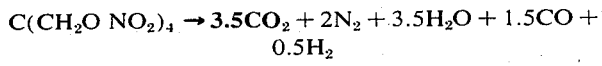

$$C(CH_2O\ NO_2)_4 \rightarrow 3.5CO_2 + 2N_2 + 3.5H_2O + 1.5CO + 0.5H_2$$

A 50 watt continuous wave $CO_2$ laser was used as the probe laser. The output beam was apertured to define the beam and reduce the intensity to 3 watts. The height of the probe laser beam above the surface of the explosive was about 0.25 cm. The interrogated path length through the expansion products at this height is approximately 0.5 cm. In two experimental runs gains of 1.15 (15%/cm) and 1.10 were observed. Positive gain occurred in both runs for about 150 $\mu$sec.

PETN was used initially in these experiments only because of its ready availability and convenience in handling. The detonation products of PETN do not form an optimum or even a good $CO_2$ lasing mixture because of the excess of $H_2O$ present. Thus probing of the expansion region 1 and 2 cm above the axis of the explosive produced only attenuation of the beam. This was expected because the population inversion produced in the initial expansion is quickly removed by collisions with the very high $H_2O$ concentration in the detonation products of PETN.

Nonetheless, these simple experiments demonstrate that useful $CO_2$ population inversion for laser amplification is possible in the free expansion of the detonation products of most condensed explosive systems that contain carbon, oxygen, and nitrogen. More optimal explosive mixtures are those whose products more closely approximate the lasing mixture of a conventional $CO_2$ laser (i.e., $CO_2$, $N_2$, and $H_2O$) in amounts to yield highest gain and efficiency.

Figure 2:
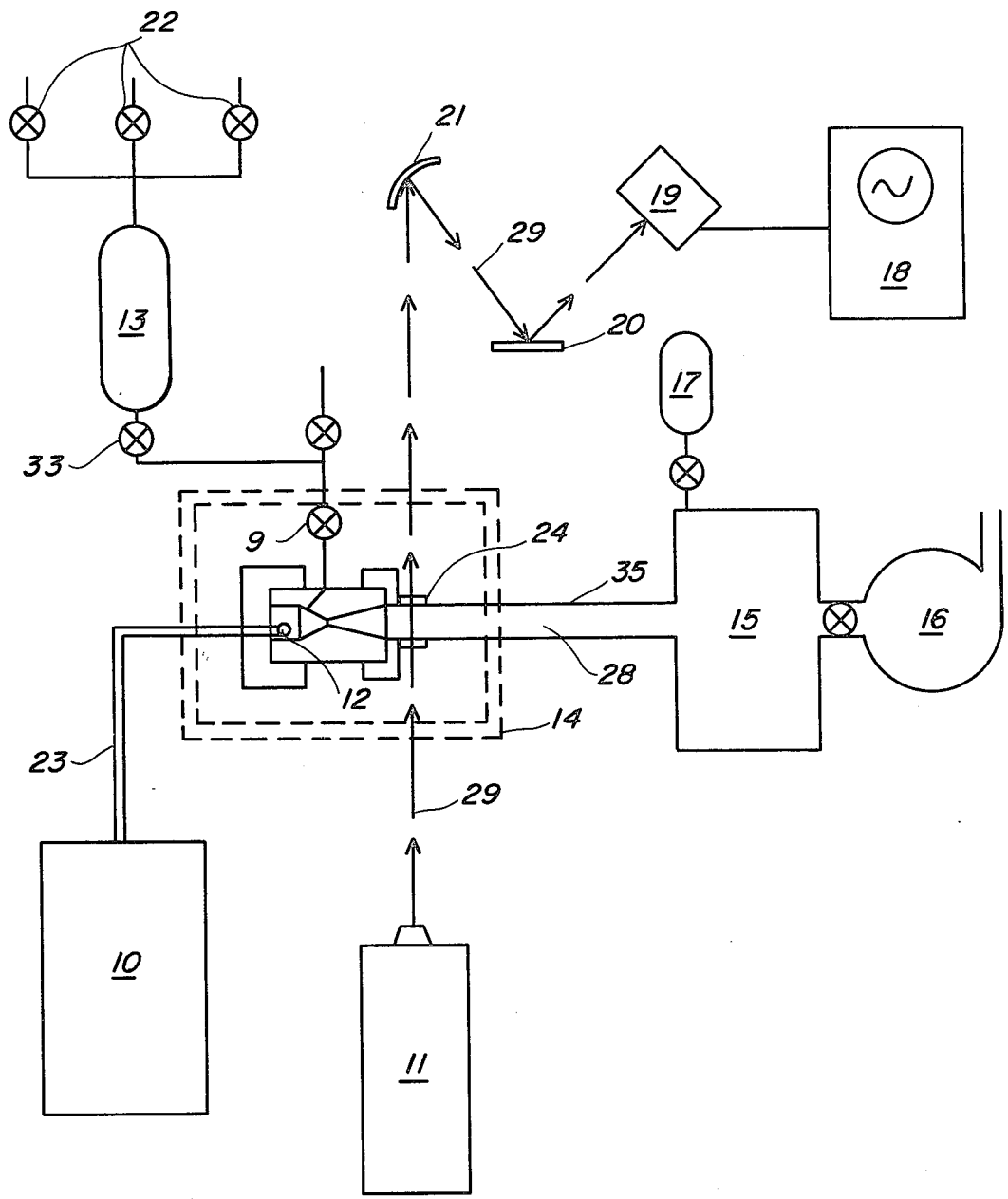
FIG. 2 is a schematic of an explosive laser system employing expansion of the detonation products in a gas dynamic configuration.
Figure 3:
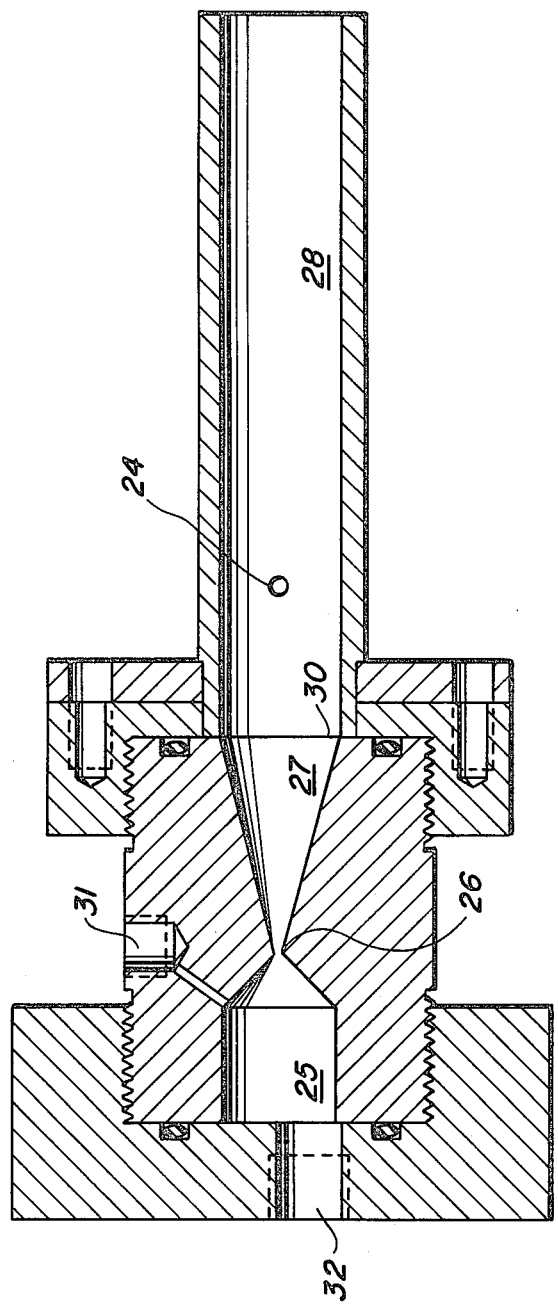
FIG. 3 is a cross-sectional view of the reservoir, supersonic nozzle, and expansion chamber of the explosive laser system of FIG. 2.

To avoid possible problems associated with the refraction of a laser beam in expanding detonation products because of varying densities, an explosive laser system having the configuration shown in FIGS. 2 and 3 has been devised. This configuration is basically that of a gas dynamic laser. A condensed explosive 12 is placed in stagnation reservoir 25. A detonator associated with explosive 12 is connected to firing and time delay units 10 by means of electrical leads 23. Leads 23 enter reservoir 25 through electrical passthrough port 32 which also provides access to reservoir 25 for placement of explosive 12. A diaphragm 30 is provided so that reservoir 25 and nozzle 27 may be pressurized with a gas or mixture of gases through gas inlet port 31. Gases are admitted to gas mixing chamber 13 through inlet lines 22 and mixed in the desired ratio before being passed into reservoir 25 and nozzle 27. The location of diaphragm 30 is not critical. Should there be no desire or necessity for having a gas or gases to interact and react with the detonation products from explosive 12, diaphragm 30 may be readily removed and reservoir 25 sealed off from gas mixing chamber 13 by means of valves 9 and 33. Located downstream of diaphragm 30 is expansion region 28 and vacuum chamber 15. Optical windows 24 are provided in tube 35 so that a beam 29 from probe laser 11 may pass perpendicularly through the expanding reaction products from the detonation of explosive 12. Beam 29 from probe laser 11 is focused on detector 19 by means of mirrors 21 and 20. The output of detector 19 is read on oscilloscope 18. Sampling bottle 17 is provided so that samples of the reaction products may be withdrawn from vacuum chamber 15 for chemical analysis. The portion of the system wherein detonation and initial expansion of the reaction products occur is surrounded by blast protection enclosure 14.

The system is operated by placing a desired explosive in reservoir 25 and pressurizing reservoir 25 and nozzle 27 with a gas or gas mixture to a desired pressure. The degree of pressurization is dependent on the amount of interaction and reaction that is desired between the detonation products and the gas or gas mixture. A vacuum is established in tube 35 and vacuum chamber 15 by means of vacuum pump 16. Probe laser 11 is activated such that its beam 29 will pass through the detonation products during the time they are passing through tube 35 and explosive 12 is detonated. The initial result of the detonation is a pressure surge through the gas occupying reservoir 25 and nozzle 27. This surge serves to rupture diaphragm 30 and start a supersonic flow of gases through nozzle throat 26. Initially, the only material passing through beam 29 is the debris from diaphragm 30 and the unreacted gas or gases that had resided in nozzle 27. There is then a period of time when the gases passing through beam 29 consist of the detonation products of explosive 12 that have interacted with the gaseous atmosphere present in reservoir 25. Finally, there is a contaminated mixture of gases and solid material from the detonator and housing used to contain explosive 12. Those of ordinary skill in the explosive arts will readily be capable of devising means whereby the detonation products of explosive 12 are made to pass through nozzle 27 and through beam 29 in advance of contaminating products from detonators, housings, etc.

It will be apparent that the explosive laser system shown schematically in FIGS. 2 and 3, although experimental, is readily adapted to provide an amplifying laser system. Further, by replacing optical windows 24 with appropriate mirrors in tube 35, this explosive system can be made to operate in an oscillator mode.

The apparatus shown schematically in FIGS. 2 and 3 was used to determine the lasing characteristics of the expanding detonation products of hexanitrosobenzene (HNB). The diameter of the nozzle throat 26 was 0.036 in. and the exit diameter (at diaphragm 30) was 0.780 in., giving an expansion ratio of 469.4. The small throat height is dictated by the vibrational relaxation time of $CO_2 + N_2$ mixtures and is governed by the formula $$D_t/C^* < \tau^*$$

where $D_t$ is the throat diameter, $C^*$ is the speed of sound at the throat, and $\tau^*$ is the relaxation time. If the conditions of this formula are met, then the gases will be expanded rapidly enough to "freeze" in the vibrational population distribution that is characteristic of equilibrium conditions in reservoir 25. The large expansion ratio of the nozzle is not necessary (ratios as low as 15 can be used); however, this particular nozzle is designed to approximate free expansion conditions.

The explosion products are probed with a 50 watt continuous wave laser system. The beam power is apertured to about 5 watts and passed through the products just downstream of the nozzle exit as shown in FIG. 2. After passing through the expanded products, the probe beam 29 is focused with a 30-in. focal length mirror 21 onto the sensitive element of an Au-Ge liquid-nitrogen-cooled detector 19. The output of detector 19 is displayed on dual beam oscilloscope 18.

HNB is a solid at room temperature with a density of 1.7 g/cm³ and has the chemical formula $C_6N_6O_6$. According to the art, detonation of this explosive gives the calculated products

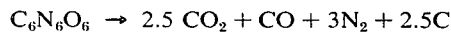
$$C_6N_6O_6 \rightarrow 2.5\ CO_2 + CO + 3N_2 + 2.5C$$

plus trace amounts of $O_2$ and NO. This product composition could not be verified when HNB was detonated and the products expanded into a vacuum. At the calculated Chapman-Jouquet conditions (4300°K), a ratio of $CO_2$ to $N_2$ of 2.5 would constitute a lasing mixture so that this product composition shows a nitrogen rich system that should be suitable for lasing. The CO in the products is not detrimental to $CO_2$ lasing; however, the solid carbon is opaque to the 10.6μm $CO_2$ wavelength. By pressurizing reservoir 25 and nozzle 27 with increasing amounts of pure $O_2$ and detonating 50 mg charges of HNB it was found that the absorption of probe beam 29 was decreased to zero at a pressure of 200 lbf/in.² of $O_2$. As observed, at this pressure all solid carbon in the reaction products had oxidized to either CO or $CO_2$ before reaching beam 29.

Using the configuration shown in FIGS. 2 and 3, 50 mg of HNB were detonated in reservoir 25 with a mixture of gases prepared in mixing chamber 13 of 2 parts $O_2$ and 1 part He. The total gas pressure in reservoir 25 just prior to the shot was 262 lbf/in.². Helium was added to the $O_2$ to act as a catalyst in depopulating the lower vibrational level of the $CO_2$ during the supersonic expansion. The HNB was in the form of a pellet attached to about 5 mg of PETN, which served as a booster. The PETN was detonated by an exploding bridge wire and in turn detonated the HNB. An oscilloscope trace of the passage of material through beam 29 showed an initial absorption due to the passage of $O_2$ and/or bits of diaphragm 30. Then followed a period of amplification as the reaction products from the HNB flowed past, followed finally by a large absorption due apparently to the combustion products of the plastic housing used to confine the HNB. The maximum observed gain was 1.3%/cm.

The preceding example was repeated with the following modifications. About 10 mg of additional HNB was placed in front of the standard HNB pellet so that its products would be blown directly towards nozzle throat 26. In addition, reservoir 25 and nozzle 27 were filled with an 80/20 mixture of $O_2$/He by volume at a pressure of 300 lbf/in.². With all other operating conditions being the same, a maximum gain of 3.12%/cm was observed. The highest gain thus far reported in the literature for a gas-dynamic laser is less than 1%.

It will be apparent to those of ordinary skill in the art that the explosive lasers disclosed herein are not limited to those in which the lasing species is CO or $CO_2$. There are many other lasing species which may be created as products of the detonation of condensed explosives. In principle, it is possible to dissolve a particular lasing substance in a condensed explosive or have it mixed with the explosive and not have it participate directly in the reaction and still be thermally pumped during the explosion and subsequent expansion. The limiting factor on this latter process would be that the resultant mixture must still be capable of detonation. Further, it will be understood by those of reasonable skill in the art that the configurations of explosive lasers are not limited to those given by example herein. Thus, for example, a $CO_2$ explosive lasing system may be operated at atmospheric pressure rather than through expansion in vacuum as shown by the foregoing examples. In such a system, the pressure broadening of the vibration levels allows energy to be extracted in very short pulses. The system is also much simplified because of the absence of any need for a vacuum system. Other obvious variations which may be successfully applied are: (a) liquid high explosives can be used; (b) temperatures can be controlled in order to solidify gaseous or liquid explosives, or to liquify gases; (c) detonator materials need not be internal but can drive a detonating shock wave through the enclosure wall from outside the system; and (d) shaped charges can be employed to provide a particular pressure-temperature-time history during the explosive reactions in order to more effectively tailor the explosive products.

What we claim is:

1. A method of forming a $CO_2$ lasing medium having a population inversion therein which comprises detonating pentaerythritol tetranitrate and allowing the products of said detonation to expand freely into vacuum.

2. A method of forming a $CO_2$ lasing medium having a population inversion exhibiting high again which comprises detonating a high explosive having essentially carbon, nitrogen, and oxygen as its elemental constituents, said detonation occurring in a stagnation reservoir containing gaseous oxygen at a pressure sufficient to oxidize any free carbon produced by said detonation, and expanding the reaction products through a supersonic nozzle.

3. The method of claim 2 wherein said stagnation reservoir contains a mixture of oxygen and helium.

4. A method of forming a $CO_2$ lasing medium having a population inversion therein which comprises (1) detonating a high explosive which (a) is a solid or a liquid at room temperature, (b) consists essentially of carbon, nitrogen, oxygen, and hydrogen, and (c) has detonation products that are $CO_2$ and other species that do not prevent $CO_2$ lasing, and (2) allowing the detonation products to expand through a supersonic nozzle into a vacuum.

5. The method of claim 4 wherein said other species are benign to $CO_2$ lasing.

6. The method of claim 4 wherein said other species are beneficial to $CO_2$ lasing.

7. The method of claim 4 wherein said supersonic nozzle has an expansion ratio of at least 15.

8. The method of claim 4 wherein said high explosive is a compound or a mixture of compounds consisting essentially of carbon, nitrogen, and oxygen.

9. The method of claim 8 wherein said high explosive contains an oxidizer.

10. The method of claim 8 wherein said detonation products interact with a gaseous atmosphere before expanding through said supersonic nozzle.

11. The method of claim 10 wherein said gaseous atmosphere contains oxygen at a pressure sufficient to oxidize any free carbon produced by said detonation.

12. The method of claim 11 wherein said gaseous atmosphere is oxygen.

13. The method of claim 11 wherein said gaseous atmosphere is a mixture of oxygen and helium.

14. The method of claim 13 wherein said high explosive is hexanitrosobenzene.

* * * * *